May 19, 1931.  F. HURKA  1,806,165
GARDEN IMPLEMENT
Filed Dec. 26, 1929
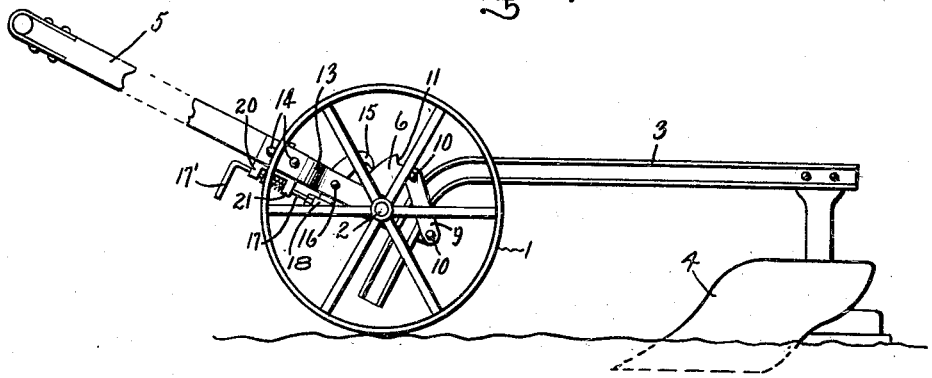
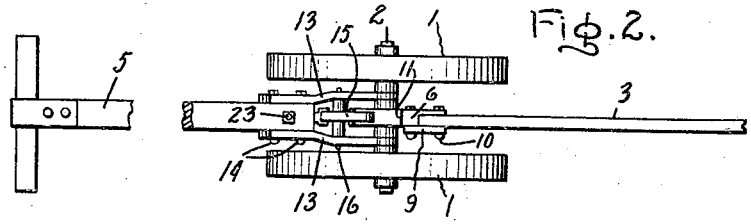
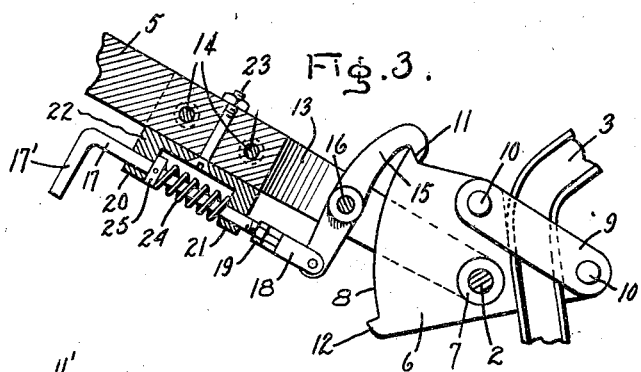
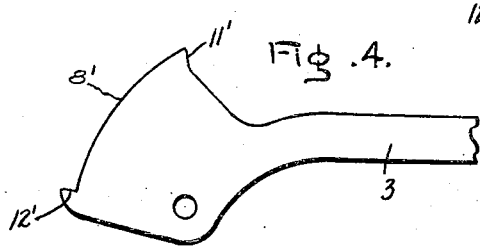
Inventor:
Frank Hurka,
by Lloyd C. Bush
His Attorney.

Patented May 19, 1931

1,806,165

UNITED STATES PATENT OFFICE

FRANK HURKA, OF SCHENECTADY, NEW YORK

GARDEN IMPLEMENT

Application filed December 26, 1929. Serial No. 416,387.

My invention relates to improvements in cultivating implements and more particularly to wheel supported hand-operated implements intended for use in small gardens.

An object of the invention is to provide an improved hand implement of simple and economical construction which may be operated with a minimum of effort and which will function in the same manner as the ordinary horse or tractor drawn implements.

Another object of the invention is to provide a wheel supported implement with which various ground working tools, such as a plow, cultivator teeth and the like, may be interchangeably used.

A still further object is to provide a construction in which a tool carrying beam is so supported as to permit it to be adjustably positioned to vary the depth of penetration of the soil by the cultivating tool, and in which means are provided whereby the beam may be conveniently elevated and held in a position in which the tool is out of contact with the ground so that the implement may be freely moved from place to place.

With these and other objects in view, the invention comprises certain novel features of construction and arrangements of parts as set forth in the following description in connection with the accompanying drawings, and more particularly pointed out in the appended claims.

In the drawings, Fig. 1 is a side elevational view of an implement in accordance with my invention; Fig. 2 is a top plan view of the implement shown in Fig. 1; Fig. 3 is a fragmentary view showing the tool supporting beam in a tilted position; and Fig. 4 is a view showing a modification of certain parts of the device.

As shown in the drawings, the invention is embodied in an implement comprising a pair of ground engaging wheels 1 mounted on an axle 2; a tool-supporting beam 3 pivotally connected at one end to the axle and projecting rearwardly therefrom, having a soil penetrating or other tool, here shown as a plow 4, detachably secured to its opposite end; and a draft arm or handle bar 5, also pivotally attached to the axle 2 and extending forwardly therefrom.

Preferably, the tool supporting beam 3 is pivotally connected to the axle 2 by means of a separate member which, as shown, is a sector shaped rocker member 6 to which the beam may be adjustably secured so that its position relative to the axle may be varied if desired to vary the depth of penetration of the soil by the plow. This sector shaped member 6 is provided with a bored hub 7 located eccentrically with respect to the curved portion 8 of the periphery of the member, whereby the latter becomes in effect a cam surface.

The bored hub 7 of the member 6 is journaled on the axle 2, midway between the two ground engaging wheels. Between its hub 7 and its apex, the sector shaped member 6 is provided with a transverse slot in which the beam 3 is firmly clamped in adjusted position by means of a plate 9 secured to the member 6 by means of the bolts 10. The cam shaped portion 8 of the member 6 is provided at its opposite ends with projecting shoulders 11 and 12 for purposes to be later described.

The propelling arm or handle-bar 5 is preferably of wood and is pivotally attached to the axle 2 by means of two off-set metal plates 13 which are fastened to opposite sides of the handle-bar 5 by means of bolts 14 and respectively journaled on the axle on opposite sides of the sector shaped member 6, as shown in Fig. 2.

A pawl 15 is pivotally mounted on a fixed pin or shaft 16 extending between the off-set plates 13 below the lower end of the handle-bar 5. The pawl is so designed and arranged that its hooked end normally rests or rides on the cam surface 8 of the member 6 as shown in Fig. 1.

For convenience in manipulating the pawl 15, I provide mechanism comprising a rod 17 which is pivotally connected at one end with the tail-piece of the pawl by means of a clevis 18, into the free end of which the rod 17 is threaded; a lock-nut 19 being provided to hold the rod in threaded adjustment with respect to the clevis. The rod 17 is slidably mounted in aligned bores in two spaced lugs 20 and 21 projecting from a plate-like bracket 22 which is secured to the handle-bar 5 adjacent its lower end, as shown in Fig. 3, by means of a screw or bolt 23. Surrounding the rod 17 between the lugs 20 and 21 of the bracket 22 is a helical spring 24, one end of which abuts the lug 21 and the other end of which abuts against a collar 25 which is fixed on the rod. The outer or projecting end 17' of the rod 17 is bent at an angle to the axis of the rod to provide a handle or pedal portion by means of which the rod may be actuated.

As illustrated in Fig. 1, the plow 4 and its supporting beam 3 are in approximately the normal operative position with relation to the handle-bar 5. If now, the operator desires to elevate the plow beam to free the plow from contact with the soil so that the implement can be freely moved about on its wheels, the handle-bar 5 is rotated upwardly about the axle 2 until the hooked end of the pawl 15 over-rides the cam surface of the member 6 and engages the shoulder 11 to latch the handle-bar to the plow supporting beam 3 in definite angular relation so that the beam may be tilted to free the plow from contact with the ground, as shown in Fig. 3, when downward pressure is applied to the handle-bar. As will be clear from the drawing, the pawl 15 during the upward movement of the handle-bar 5, slides over the cam surface of the member 6 and is thereby rotated slightly on its axis to move the rod 17 and collar 25 axially and compress the spring 24, so that when finally the pawl over-rides, the shoulder 11, the spring will react to hold the pawl in position to engage the shoulder, as shown in Fig. 3.

In order to release pawl 15 from engagement with the shoulder 11 to permit the tool to again drop into operating position, the operator merely presses downward with his foot upon the projecting end 17' of the rod 17.

The shoulder 11 is provided on the sector shaped member 6 to be engaged by the pawl 15 when the handle-bar 5 is released or dropped by the operator, in order that the pawl will not over-ride and become disengaged from the cam surface of the member 6.

If desired, the tool supporting beam 3 may be directly pivoted upon the axle 2 in which case it preferably would be provided with an integral cam shaped portion 8', and pawl engaging shoulders 11' and 12' as shown in Fig. 4.

The advantage of having the tool beam supported on an intermediate member such as the member 6, is that thereby the beam may be more conveniently made adjustable in position relating to the axle to vary the depth of penetration of the soil by a tool, such as the plow 4.

It is obvious that the particular embodiment herein described and illustrated in the accompanying drawing, is subject to modification in form and arrangement of various parts without departing from the scope of my invention as set forth in the appended claims.

What I claim as new and desire to secure by Letters Patent of the United States, is:

1. An implement of the character described, comprising a pair of ground wheels, an axle therefor, a beam pivotally supported on said axle and extending rearwardly therefrom beyond the periphery of said wheels, a ground engaging tool secured to said beam, draft means pivotally attached to said axle and extending forwardly therefrom, and cooperating means associated respectively with said beam and said draft means adapted upon limited upward rotation of the draft means about said axle to latch the draft means in fixed angular relation to the beam whereby the latter may be elevated by downward pressure subsequently applied to the draft means to disengage the tool from contact with the ground.

2. An implement of the character described, comprising a pair of ground wheels, an axle therefor, a tool-supporting beam and a draft member independently pivoted on said axle and normally extending to opposite sides thereof, a ground penetrating tool secured to said beam, said beam and draft member being provided with interlocking means adapted to be engaged upon limited upward rotation of the draft member about said axle to secure the draft member to said beam in definite angular relation whereby the beam may be elevated by downward pressure subsequently applied to the draft member to disengage said tool from contact with the ground.

3. An implement of the character described, comprising a pair of ground wheels, an axle therefor, a rocker member pivotally mounted on said axle between said wheels, a tool-supporting beam adjustably secured to said rocker member and extending rearwardly from said axle, a ground engaging tool secured to said beam, a draft member pivotally mounted on said axle and extending forwardly therefrom when in its normal operative position, and cooperating latching means associated with said rocker member and said draft member adapted to be engaged to connect the latter to the rocker member in definite angular relation upon limited upward rotation of the draft member about said axle, whereby the tool-supporting beam may be elevated when downward pressure is applied to the draft member to disengage the tool from contact with the ground.

4. An implement of the character described, comprising a pair of ground wheels, an axle therefor, a beam pivotally supported on said axle and extending rearwardly therefrom, a ground engaging tool secured to said beam, draft means pivotally attached to said axle and extending forwardly therefrom, co-operating latching elements associated respectively with said beam and said draft means adapted upon limited relative rotation thereof about said axle to latch the draft means in definite angular relation to said beam, and means associated with the latching element on the draft means for effecting the disengagement of said latching elements.

5. An implement of the character described, comprising a pair of ground wheels, an axle therefor, a rocker member pivotally mounted on said axle and provided with a pawl engageable shoulder, a tool-supporting beam adjustably secured to said rocker member and extending rearwardly from said axle, a ground engaging tool secured to said beam, draft means pivotally mounted on said axle and extending forwardly therefrom when in the normal operating position, a latching pawl pivotally mounted on said draft means and adapted to engage the shoulder on said rocker member upon limited upward rotation of the draft means about said axle, and means for effecting the release of said pawl from engagement with the shoulder on said rocker member.

6. An implement of the character described, comprising a pair of ground wheels, an axle therefor, a sector-shaped rocker member pivotally mounted on said axle and provided with a pawl engageable shoulder, a tool beam adjustably secured to said sector-shaped member and extending rearwardly from said axle, a draft arm rotatably mounted on said axle and extending forwardly therefrom when in normal operating position, a latching-pawl pivotally mounted on said draft arm, the outer end of said pawl normally riding on the curved periphery of said sector-shaped member and adapted upon limited upward rotation of said draft arm about said axle to engage said shoulder on said sector-shaped member, and means associated with said draft arm adapted to effect the release of said pawl from engagement with said shoulder.

In witness whereof, I have hereunto set my hand this 21st day of December, 1929.

FRANK HURKA.